United States Patent [19]

McIlwain

[11] 4,063,405
[45] Dec. 20, 1977

[54] SHOCK-ISOLATED ELECTRIC ACTUATOR FOR MOVING A HARVESTING MACHINE HEADER

[75] Inventor: Irwin D. McIlwain, Lancaster, Pa.

[73] Assignee: Sperry Rand Corporation, New Holland, Pa.

[21] Appl. No.: 715,275

[22] Filed: Aug. 18, 1976

[51] Int. Cl.² .................................... A01D 67/00
[52] U.S. Cl. .................................... 56/208; 56/12.6; 56/15.9
[58] Field of Search .................... 56/208, 15.9, 16.1, 56/341, 12.6, 228, 218; 254/98, 103

[56] References Cited

U.S. PATENT DOCUMENTS

| | | | |
|---|---|---|---|
| 2,320,953 | 6/1943 | Shenstone | 254/98 |
| 2,654,206 | 10/1953 | Dobrowski | 56/208 |
| 4,008,556 | 2/1977 | Wegscheid et al. | 56/12.6 |

FOREIGN PATENT DOCUMENTS

| | | | |
|---|---|---|---|
| 691,572 | 7/1964 | Canada | 56/208 |
| 454,140 | 1/1949 | Canada | 56/208 |

*Primary Examiner*—Jay N. Eskovitz

*Attorney, Agent, or Firm*—John R. Flanagan; John B. Mitchell; Frank A. Seemar

[57] ABSTRACT

The improvement incorporated by a harvesting machine is a shock-isolated electric actuator interconnected between the header and the frame of the machine and being operable to move the header between field operating and transport positions relative to the frame. Electrical circuitry is provided for interconnecting the actuator to a source of electrical power and a switch is disposed in the circuitry for controlling the transmission of power to the actuator and thereby the operation of the actuator. Also, the electric actuator at one end is operably connected to the header and a shock isolator assembly interconnects the other end of the actuator to the machine frame. The shock isolator assembly includes a support bracket rigidly mounted on the frame, an elongated member connected to the other end of the actuator and a shock absorbing body formed of resilient rubber-like material supporting the elongated member and, in turn, itself being mounted to the support bracket. Any shocks or impacts against the header and transmitted to the actuator are absorbed within the resilient material of the body.

5 Claims, 4 Drawing Figures

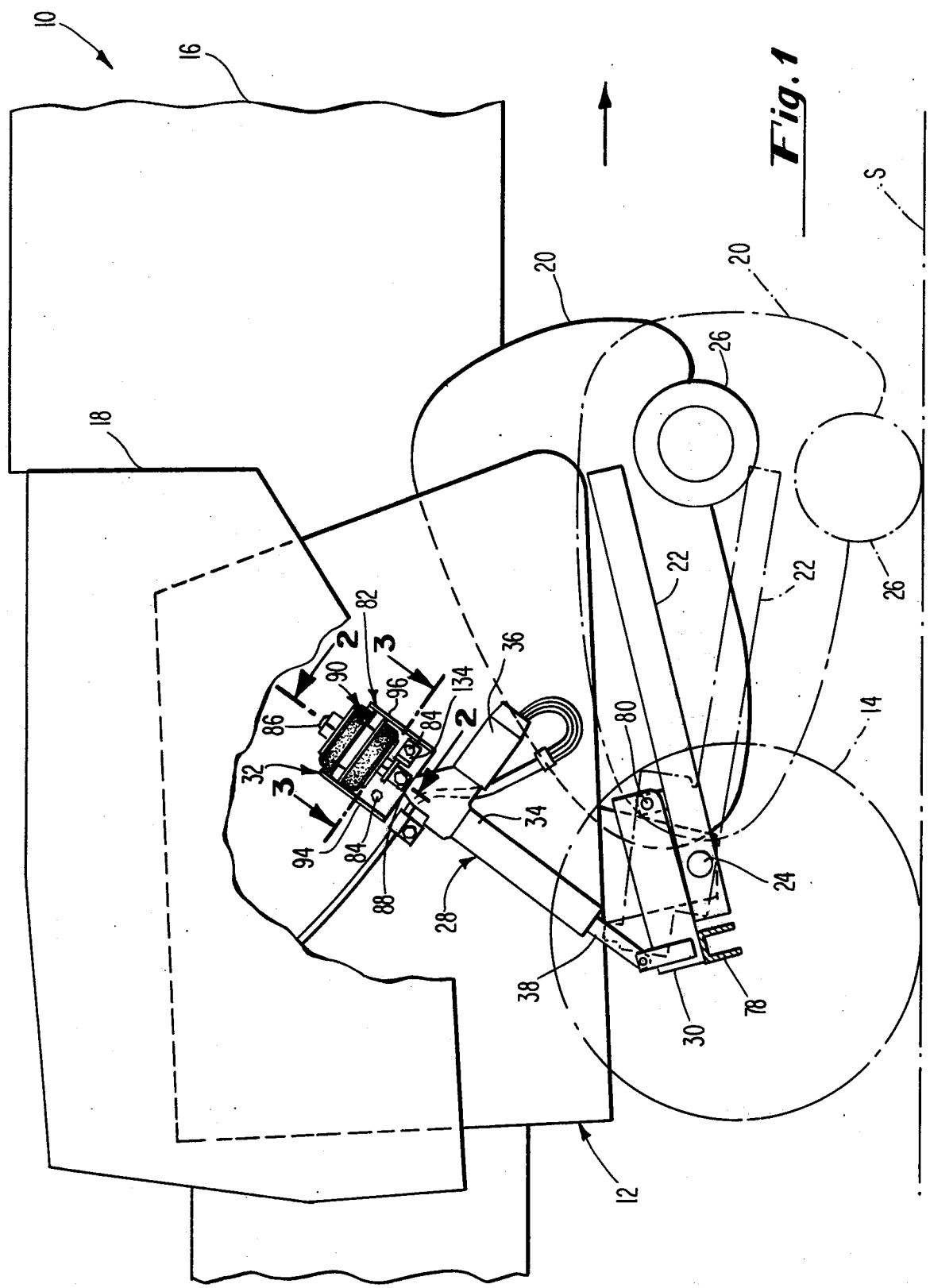

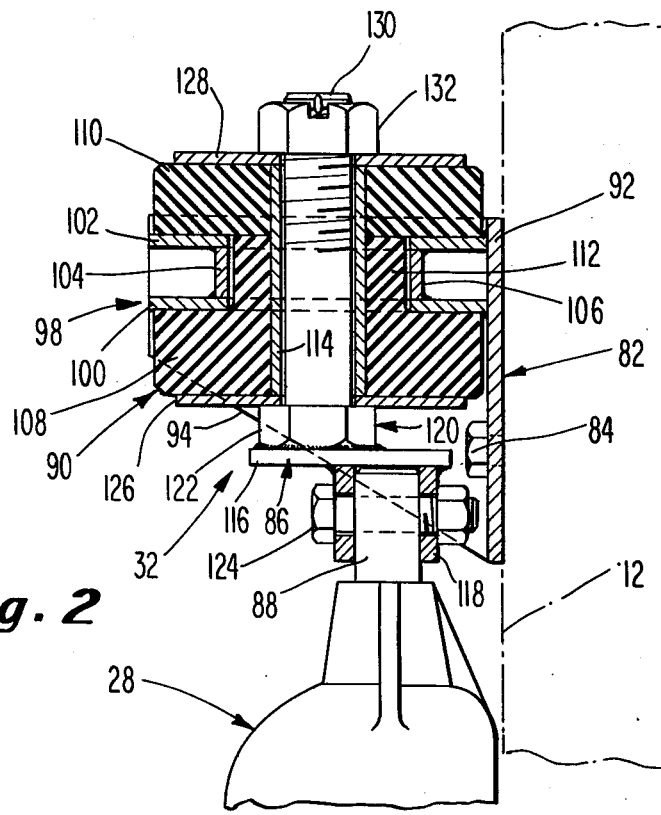

SHOCK-ISOLATED ELECTRIC ACTUATOR FOR MOVING A HARVESTING MACHINE HEADER

BACKGROUND OF THE INVENTION

1. Field of the Invention

The present invention generally relates to a crop material harvesting machine, such as a hay baler, and, more particularly, is concerned with a shock-isolated electric actuator for moving the header of the harvesting machine, such as the pickup assembly of the baler, between field operating and transport positions.

2. Description of the Prior Art

Up to the present time, ordinarily headers on agricultural harvesting machines, such as pickup assemblies on balers, have been lowered to a field operating position or raised to a transport position either manually or hydraulically. Thus, operators were required, in the case of pull-type machines, to either dismount from the tractor and manually lift (or lower) the pickup assembly or reach rearwardly from the tractor seat to activate a hydraulic valve by manipulating a control rod extending from the baler.

Such requirements are time-consuming, inconvenient and distracting for operators of machines such as balers, and, therefore, a need exists for improvement of machines in this area.

SUMMARY OF THE INVENTION

The present invention provides an improvement in the form of a shock-isolated electric actuator for moving the header of a harvesting machine, such as the pickup assembly of a baler, between field operating and transport positions which can be operated through a switch located at the operator's side on the tractor. The inconvenience of dismounting from the tractor to manually move the header or the distraction of turning around from the tractor seat to operate a control rod for a hydraulic valve is eliminated by the improvement provided by the present invention. Furthermore, shocks or impacts encountered by the pickup assembly are dampened by means provided by the improvement in order to avoid damage to the actuator.

Accordingly, the present invention relates to an improvement incorporated in a crop harvesting machine of the type having a frame adapted for movement across a field and a header mounted to the frame for movement between various positions displaced at different heights above the field. The improvement comprises a shock-isolated electric actuator interconnecting the header and the frame and being operable to move the header between the various positions, such as a lowered field operating position and a raised transport position. Also, the improvement includes means for operating the actuator to move the header between its positions.

More particularly, the means for operating the actuator includes a source of electrical power, electrical circuitry interconnecting the power source and the actuator, and switch means in the circuitry operable for controlling the transmission of electrical power to the actuator along the circuitry and thereby the operation of the actuator in moving the header between the positions.

Furthermore, the electric actuator at one end thereof is operably connected to the header and a shock isolator assembly interconnects the other end of the electric actuator to the frame. The shock isolator assembly includes a support bracket rigidly mounted on the frame of the machine, an elongated member connected to the other end of the actuator and a body formed of resilient rubber-like material supporting the elongated member amd, in turn, itself being mounted to the support bracket. Any shocks or impacts against the header and transmitted to the electric actuator are absorbed within the resilient material of the body.

The advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 1 is a side elevational view of a fragmentary portion of a hay baler which incorporates the shock-isolated electric actuator improvement provided by the present invention;

FIG. 2 is an enlarged view taken along line 2—2 of FIG. 1, showing the shock isolator assembly partly in section and the end of the actuator connected to the isolator assembly being shown in elevation;

FIG. 3 is an enlarged view taken along line 3—3 of FIG. 1, showing a stop which prevents the housing of the electric actuator from rotating upon operation of the actuator; and FIG. 4 is a schematical representation of the electrical circuitry and electrical components included therein for operating the electric actuator.

DETAILED DESCRIPTION OF THE INVENTION

In the following description, right hand and left hand references are determined by facing in the direction of the arrow in FIG. 1, which is the same as the forward direction of travel of the hay baler across the field. Also, in the following description, it is to be understood that such terms as "forward," "rearward," "left," "upwardly," etc., are words of convenience and are not to be construed as limiting terms.

In General

Referring now to the drawings, and particularly to FIG. 1, there is partly shown a crop harvesting machine in the form of a hay baler, being indicated generally by numeral 10, having a frame 12 supported and made mobile by right and left ground wheels 14 (only the right wheel being shown in broken line form in FIG. 1). At the left side of the frame 12, a bale chamber 16 extends longitudinally fore-and-aft and a reciprocatory plunger (not shown) is operable therein for compaction of crop material into bales. A feeder housing 18 extends laterally from the inboard side of the bale chamber 16 and has a feeding mechanism (not shown) operably disposed therein for feeding crop material into the bale chamber 16 through an inlet opening (not shown) formed therein in its inboard side.

Forwardly of, below and along the feeder housing 18 is disposed a pickup assembly 20 being operable to pick up windrowed crop material from the field, as the baler 10 is advanced across the field, and deliver the same rearwardly to the feeder mechanism in the feeder housing 18.

The pickup assembly 20 includes generally fore-and-aft extending right and left side mounting rails 22 (only the right one being seen in FIG. 1) which are pivotally connected just forwardly of the rear ends thereof at locations 24 on the baler frame 12. By such mounting arrangement, the pickup assembly 20 is pivotally movable about pivotal connections 24 between various positions vertically displaced at different heights above the field, such as between a lowered field operating position as seen in broken line form in FIG. 1 wherein a guage wheel 26 of the pickup assembly rides on the field and a raised non-operating transport position as seen in solid line form in FIG. 1.

Shock-Isolated Electric Actuator Improvement For Pivoting Pickup Assembly

As seen in FIG. 1, and in greater detail in FIG. 2, the improvement of the present invention provides an electric actuator 28 being connected at one end to a pivotal link 30 of the pickup assembly 20 and a shock isolator assembly 32 interconnecting the other end of the actuator 28 to the frame 12 of the baler 10. The improvement also provides control means, generally designated 33 in FIG. 4, for operating the actuator 28.

The electric actuator 28 is of the type having an internal overload clutch and may be the one commercially available from the Motion Control Systems Division of Warner Electric Brake and Clutch Company, being designated as Part No. 7178-401-001. Basically, the actuator 28 includes a housing 34, an electric motor 36 mounted on the housing 34 and operably drivingly connected to a ball screw (not shown) enclosed within the housing 34 and a shaft 38 which is driveingly coupled to the ball screw and extends outwardly from the lower end of the housing 34. By operating the electric motor 36 in one direction, the shaft 38 is progressively extended from the housing 34, while operating the motor 36 in reverse direction causes retraction of the shaft 38 into the housing 34.

The operation of the electric actuator 28 is controlled by the operator while on the tractor seat through manipulation of an electrical toggle switch 40 of the control means 33 located in a control box (not shown) disposed by the operator's side.

The toggle switch 40 is of the double pole, double throw, spring centered off type and may be the one commercially available from Cole-Hersee Co., designated as Part No. 55054-01. The switch 40 may be manually placed in either one of three different positions by the operator moving a lever (not shown) on the switch 40, namely, "lower," "off" or "raise" positions. In the "off" position of the switch 40, the double pole of the switch is located in a spring centered position in which a pair of center terminals 42,44 are not connected to either a pair of top terminals 46,48 or a pair of bottom terminals 50,52. When the lever of the switch 40 is moved to the "raise" position, the double pole of the switch 40 is moved to an up position, as respresented by the pair of solid line arrows in FIG. 4, in which the pair of center terminals 42,44 are electrically interconnected to the pair of top terminals 46,48. When the lever of the switch 40 is moved to the "lower" position, the double pole of the switch 40 is moved to a down position, as represented by the pair of broken line arrows in FIG. 4, in which the pair of center terminals 42,44 are electrically interconnected to the pair of bottom terminals 50,52.

The right top terminal 46 of the switch 40 is electrically connected by a conductor line 54 to the ignition switch IS of the towing tractor or of the power source on the baler and therefrom by a conductor line 56 to the positive terminal 58 of a suitable source of electrical power, such as a battery 60. The left top terminal 48 of the switch 40 is electrically connected by a conductor line 62 to the negative terminal 64 of the battery 60. The right center terminal 42 of the switch 40 is electrically connected by a conductor line 66 to a right terminal 68 of the motor 36, while the left center terminal 44 of the switch 40 is electrically connected by a conductor line 70 to the left terminal 72 of the motor 36. Furthermore, the right top terminal 46 of the switch 40 is electrically connected to the left bottom terminal 52 by a conductor line 74, while the left top terminal 48 is electrically connected to the right bottom terminal 50 by a conductor line 76.

When the ignition switch IS of the tractor is turned on and the lever of the toggle switch 40 is manually moved to place the switch 40 in its "raise" position, the double pole of the switch is moved from its spring centered off position to its up position, as represented by the pair of solid line arrows in FIG. 4. The circuit is then completed from the power source 60 through the motor 36 and the motor 36 is caused to run in one predetermined direction to operate the ball screw (not shown) in the actuator housing 34 so as to extend the actuator shaft 38 from the housing 28. As the shaft 38 extends or moves toward the free end of the link 30, the latter bears down on the rear end portion of the right side mounting rail 22 to cause the same to pivot counterclockwise, as viewed in FIG. 1, about pivotal connection 24 and thereby lift the pickup assembly 20 toward its raised transport position, as shown in solid line form in FIG. 1. When the desired maximum height of the pickup assembly 20 above the field is reached, the link 30 contacts a stop member 78 fixed to the baler frame 12. Such contact causes the internal overload clutch (not shown) within the actuator housing 34 to terminate rotation of the internal ball screw by the motor 36, thereby preventing any possible damage to the actuator 28. Accordingly, because of the presence of the overload clutch, operation of the actuator 28 in lifting the pickup assembly 20 is automatically terminated once the desired height of the pickup assembly 20 is reached, even though the motor 36 continues to run until the operator manually shuts off electrical power to the motor 36 by releasing the lever of the toggle switch 40 whereby the same moves back to the "off" position which places the double pole of the switch 40 back at the center off position.

To lower the pickup assembly 20, the operator manually moves the lever of the toggle switch 40 to the "lower" position. In so doing, the double pole of the switch 40 is moved from its center off position to its down position, as represented by the pair of broken line arrows in FIG. 4, which completes the circuit from the power source 60 in reverse through the motor 36 so as to cause the motor 36 to run in a reverse direction. Such operation of the motor 36, in turn, operates the internal ball screw in the actuator housing 34 such that it causes the shaft 38 to retract back into the actuator housing 34. As the shaft 38 moves away from the free end of the link 30, the right side mounting rail 22 will pivot clockwise, as viewed in FIG. 1, due to the pull of gravity on the pickup assembly 20. The pickup assembly 20 will have reached its lowered position, as shown in broken line form in FIG. 1, by the time the shaft 38 has fully retracted. Again, the internal overload clutch (not shown) terminates rotation of the internal ball screw, preventing any possible damage to the actuator 28, when the shaft 38 has fully retracted even though the motor 36 continues to run until the operator manually releases the lever of the toggle switch 40 back to the "off" position.

It should also be understood that the operator may raise or lower the pickup assembly 20 to any intermediate position between the field operating and transport positions shown in FIG. 1 and retain the pickup assembly 20 at such position by moving the lever of the switch 40 from the "off" position to either the "raise" or "lower" position, and then releasing the lever back to the "off" position when the pickup assembly 20 reaches the desired intermediate position.

Further, when lowering the pickup assembly 20 to the field operating position, it should be mentioned that the guage wheel 26 of the pickup assembly 20 contacts the field surface S before the actuator shaft 38 is fully retracted. This arrangement permits the guage wheel 26 to ride on and follow the field surface contour as the baler 10 is advanced across the field with the pickup assembly 20 free to pivot up and down because of the pivotal interconnection of the actuator shaft 38 to the right side mounting rail 22 via the link 30 which is pivotally connected to the rail 22 at location 80.

If the actuator 28 was rigidly mounted to the baler frame 12, it would be susceptible to being damaged by severe impacts or shock loads transmitted thereto when either of the wheels 14 of the baler 10 encountered an obstacle, especially when the pickup assembly 20 is being held in its raised transport position by the actuator 28. However, the actuator 28 is anchored to the frame 28 by the shock isolator assembly 32 which functions to dampen these shock loads and thereby avoid the possibility of any damage resulting to the actuator 28.

Turning to FIGS. 1 and 2, the shock isolator assembly 32 includes a support bracket 82 rigidly mounted on the baler frame 12 by bolts 84, an elongated member 86 connected to the other anchor end 88 of the actuator 28 and a body, generally designated 90, formed of resilient rubber-like material supporting the elongated member 86 and, in turn, being fixedly mounted to the support bracket 82. By such arrangement, shock loads encountered by the pickup assembly 20 and transmitted therefrom to the electric actuator 28 are absorbed within the resilient material of the body 90.

The support bracket 82 includes a flat base plate 92 which is secured by the bolts 84 flush against a side portion of the baler frame 12, a pair of spaced apart upright side plates 94,96 fixed to opposite edges of the base plate 92 such that the side plates 94 extend outwardly from the frame side portion, and wall means, generally designated 98, extending transversely between and interconnected to the side plates 94 and also extending outwardly from and connected to the base plate 92 near the upper end portion of the latter. The wall means 98 is comprised by a pair of side-by-side spaced apart flat wall plates 100,102 having respective centrally-located circular openings defined therethrough with a pair of upper and lower flat reinforcing tabs 104,106 interconnecting the wall plates 100,102 above and below the openings therein.

As clearly seen in FIG. 2, the resilient body 90 includes a pair of enlarged cylindrical donut-shaped portions 108,110 with a reduced cylindrical donut-shaped portion 112 extending from one side of the one enlarged portion 108. The portions 108,110,112 each have a central bore defined therethrough. The outside diameter of the reduced portion 112 is less than the identical diameters of the openings in the wall plates 100,102 which allows the reduced body portion 112 to be inserted through the wall plate openings with the one enlarged body portion 108 disposed against the outer side of the one wall plate 100. The other enlarged body portion 110 is disposed against the outer side of the other wall plate 102 and the exposed end of the reduced body portion 112. In such arrangement of the body portions 108,110,112, a tubular metal sleeve 114 is inserted through the aligned bores of the body portions. In unassembled condition the axial length of the body portions together is somewhat greater than the length of the sleeve 114.

The elongated member 86 includes a flat rib plate 116 having an annular collar 118 secured to and extending outwardly from the lower half of one side thereof and a bolt 120 secured at its head end 122 to and extending outwardly from the upper half of the other opposite side of the rib plate 116. The collar 118 receives the cylindrical anchor end 88 of the actuator 28 and is connected to the same by a bolt 124 which extends through diametrically-opposed openings in the collar 118 being aligned with a diametric bore in the end 88 and fastens the collar 118 and actuator end 88 together.

Annular discs 126,128, with central circular openings defined therethrough having identical diameters being generally equal to the inside diameter of the sleeve 44, are placed at opposite ends of the assembled body portions 108,110,112 and the sleeve 114 and then the stem 130 of the bolt 120 of the elongated member 86 is inserted through the central openings in the annular discs 126,128 and through the sleeve 114. A nut 132 is applied to the outer threaded end of the stem 130 which clamps and compresses the body portions 108,110,112 together between the annular discs 126,128 until the latter respectively abut against opposite ends of the sleeve 114. With the discs 126,128 abutting the ends of the sleeve 114, it will be readily seen that a rigid structure is, in effect, provided by the discs and sleeve with the elongated member 86 and the anchor end 88 of the actuator 28. However, the discs 126,128 have a smaller diameter than the enlarged body portions 108,110 and, therefore, the lower disc 126 does not contact the base plate 92 of the support bracket 82. Accordingly, with the resilient body 90 being interposed between the aforementioned rigid structure and the support bracket 82, the rubber-like consistency of the body 90 allows the same to deform and thereby absorb or dampen shock forces transmitted thereto through the aforementioned rigid structure being clamped to the body 90, while at the same time, the resilient consistency of the body 90 provides a structural interconnection of the actuator 28 to the frame 12 which has sufficient integrity to satisfactorily anchor the actuator as the latter is operated to move and support the pickup assembly 20 between its field operating and transport positions.

Also, as seen in FIG. 3, a angle-shaped stop 134 is attached to the base plate 92 of the support bracket 82 by one of the bolts 84 so as to be disposed in contact with a side of the rib plate 116 of the elongated member 86. The stop 134 acts to prevent the actuator body 34 from rotating upon operation of the actuator 28.

It is thought that the improvement provided by the present invention and many of its attendant advantages will be understood from the foregoing description and it will be apparent that various changes may be made in the form, construction and arrangement of the parts thereof described without departing from the spirit and scope of the invention or sacrificing all of its material advantages, the form hereinbefore described being merely a preferred or exemplary embodiment thereof.

Having thus described the invention, what is claimed is:

1. In a crop harvesting machine of the type having a frame and a header mounted to said frame for pivotal movement relative thereto about a pivot axis between a field operating position and a transport position, the improvement comprising:
   a. an electric rotary activator having a longitudinal axis and a first end and a second end, said first end of said actuator connect to said header at a point remote from said pivot axis;
   b. a support bracket having a wall portion rigidly mounted to said frame and a plate-like holder portion extending substantially perpendicularly from said wall portion, said holder portion having an opening therethrough with an axis substantially parallel to the longitudinal axis of said electric actuator;
   c. a resilient rubber-like member affixed to said holder portion of said support bracket and including segments on both sides thereof with an intermediate segment extending through said opening in said holder portion, said resilient member further including an opening therethrough co-axial with the opening through said holder portion;
   d. connector means operably connected to said resilient member and said second end of said actuator;
   e. stop means affixed to said bracket and extending away therefrom to operably engage said connector means and prevent rotation thereof beyond a predetermined angle; and
   f. electrical control means connected to said actuator for selective operation thereof.

2. The corp harvesting machine of claim 1 wherein:
the axis of said opening to said holder portion is spaced from the longitudinal axis of said actuator.

3. The crop harvesting machine of claim 2 wherein said connector means further comprises:
   an elongate portion extending through said opening in said resilient member and affixed on both sides thereof;
   a fastener attached to said second end of said actuator; and
   a linking portion connected to each of said elongate portion and said fastener.

4. The crop harvesting machine of claim 3 wherein:
said stop means is positioned to operably engage said linking portion of said connector means.

5. The crop harvesting machine of claim 4 wherein said electrical control means further includes:
a switch means to selectively operate said actuator to either raise or lower said header.

* * * * *